(12) United States Patent
Lambert et al.

(10) Patent No.: US 12,534,035 B2
(45) Date of Patent: Jan. 27, 2026

(54) SYSTEMS AND METHODS FOR ACCIDENT PREDICTION

(71) Applicant: Gentroo Mobile Management Ltd., Sault Ste. Marie (CA)

(72) Inventors: Alexander Lambert, Sault Ste. Marie (CA); Joshua McColeman, Waterloo (CA)

(73) Assignee: GENTROO MOBILE MANAGEMENT LTD., Marie (CA)

( * ) Notice: Subject to any disclaimer, the term of this patent is extended or adjusted under 35 U.S.C. 154(b) by 158 days.

(21) Appl. No.: 18/506,830

(22) Filed: Nov. 10, 2023

(65) Prior Publication Data

US 2024/0157900 A1    May 16, 2024

Related U.S. Application Data

(60) Provisional application No. 63/383,361, filed on Nov. 11, 2022.

(51) Int. Cl.
*B60R 21/0132* (2006.01)
*B60Q 9/00* (2006.01)
(Continued)

(52) U.S. Cl.
CPC .......... *B60R 21/0132* (2013.01); *B60Q 9/008* (2013.01); *G08B 3/10* (2013.01);
(Continued)

(58) Field of Classification Search
CPC ........ G16H 40/67; G16H 80/00; G16H 10/60; G16H 10/20; G16H 40/20; G16H 50/20; G16H 50/30; G16H 40/63; G16H 15/00; G16H 20/10; G16H 40/60; G16H 20/70; G16H 20/30; G16H 20/60; G16H 30/40; G16H 50/50; G16H 10/00; G16H 20/00; G16H 30/00; G16H 40/00; G16H 50/00; G16H 70/00; H04L 51/02; H04L 5/02; H04L 12/2818; H04L 12/2825; H04L 12/283; H04L 67/12; H04L 51/214;
(Continued)

(56) References Cited

U.S. PATENT DOCUMENTS 10,319,209 B2 * 6/2019 Carlton-Foss ......... G06N 20/00
2020/0077892 A1 * 3/2020 Tran ....................... G08B 21/02
(Continued)

OTHER PUBLICATIONS

Sharma, Sejal. "New AI-powered socks send signals to assist dementia, autism patients", https://interestingengineering.com/innovation/ai-powered-socks-assist-dementia-autism, Oct. 23, 2023.

*Primary Examiner* — Daniel Previl
(74) *Attorney, Agent, or Firm* — Curatolo Sidoti & Trillis Co., LPA; Salvatore A. Sidoti; Floyd Trillis, III

(57) ABSTRACT

Systems and methods in accordance with the present disclosure include techniques for predicting an accident, comprising: receiving monitoring data from a user device associated with a user, the monitoring data indicative of movement of the user; determining a user action based on the monitoring data using a first artificial intelligence model; and determining a probability of occurrence of one or more potential accidents based on the determined user action and the monitoring data using a second artificial intelligence model.

20 Claims, 13 Drawing Sheets

(51) Int. Cl.
  *G08B 3/10* (2006.01)
  *G08B 5/22* (2006.01)
  *G08B 6/00* (2006.01)
  *G08B 21/18* (2006.01)
  *G08G 1/01* (2006.01)
  *H04W 4/02* (2018.01)

(52) U.S. Cl.
  CPC ......... *G08B 5/22* (2013.01); *G08B 6/00* (2013.01); *G08B 21/182* (2013.01); *G08G 1/0129* (2013.01); *H04W 4/02* (2013.01)

(58) Field of Classification Search
  CPC ..... H04L 1/00; H04L 5/00; H04L 7/00; H04L 9/00; H04L 12/00; H04L 13/00; H04L 15/00; H04L 17/00; H04L 19/00; H04L 21/00; H04L 23/00; H04L 25/00; H04L 27/00; G06F 3/167; G06F 18/2413; G06F 16/22; G06F 16/24522; G06F 16/24568; G06F 16/24578; G06F 16/248; G06F 16/735; G06F 16/738; G06F 16/9024; G06F 16/9035; G06F 16/9535; G06F 21/577; G06F 2221/033; G06F 3/0481; G06F 3/04817; G06F 3/0482; G06N 20/00; G06N 3/045; G06N 3/0464; G06N 3/09; G06N 3/08; G06N 3/092; G06N 3/084; G06N 7/01; G06N 20/10; G06N 5/022; G08B 21/0423; G08B 21/043; G08B 21/0446; G08B 21/0469; G08B 21/0476; G08B 21/0484; G08B 21/0415; G08B 21/0453; G08B 21/185; G08B 21/24; G08B 1/02; G08B 13/22; G08B 17/10; G08B 19/005; G08B 21/02; G08B 21/0461; G08B 21/182; G08B 7/062; G08B 7/066; G08B 21/0492; G08B 25/009; G08B 25/08; G08B 31/00; G08B 5/36; G08B 6/00; A61B 5/1117; A61B 5/7264; A61B 2562/0219; A61B 5/0205; A61B 5/7267; A61B 5/7275; A61B 5/742; A61B 5/746; A61B 2562/0223; A61B 5/0002; A61B 5/11; A61B 5/6815; A61B 5/7246; A61B 5/7405; A61B 5/7455; A61B 5/747; A61B 2505/07; A61B 2560/029; A61B 2562/0204; A61B 2562/0209; A61B 2562/0247; A61B 2562/0261; A61B 2562/0271; A61B 2562/06; A61B 2562/08; A61B 3/113; A61B 5/0004; A61B 5/0015; A61B 5/0022; A61B 5/01; A61B 5/02055; A61B 5/0531; A61B 5/1114; A61B 5/1115; A61B 5/1116; A61B 5/1118; A61B 5/112; A61B 5/296; A61B 5/297; A61B 5/4806; A61B 5/4833; A61B 5/4836; A61B 5/6803; A61B 5/6804; A61B 5/6807; A61B 5/6816; A61B 5/6817; A61B 5/6867; A61B 5/7465; H04W 4/90; H04W 4/027; H04W 4/029; H04W 4/12; H04W 4/02; H04W 4/024; H04W 4/026; G06Q 40/08; G06Q 10/20; G06Q 30/01; G06Q 30/018; G06Q 30/0269; G06Q 30/0613; G06Q 50/163; G06Q 10/06311; G06Q 10/06312; G06Q 10/06314; G06Q 10/109; G06Q 10/1091; G06Q 10/1093; G06Q 10/1097; G06Q 30/0215; G06Q 30/0236; G06Q 50/01; G06V 10/764; G06V 10/82; G06V 30/1916; G06V 30/194; G06V 40/172; G06V 40/23; G06V 10/7747; G06V 20/41; G06V 20/44; G06V 20/49; G06V 20/70; H04R 2225/55; H04R 25/554; H04R 2225/39; H04R 2460/07; H04R 25/305; H04R 25/552; H04R 25/609; G01C 21/20; G01R 19/1659; G01R 22/068; G01S 13/583; G01S 13/88; G01S 7/415; G01S 7/417; G01S 19/19; G05B 15/02; H02J 13/00006; H04N 23/661; H04N 21/2743; H04N 21/4788; H04N 21/858; Y02A 90/10; G06T 2207/10016; G06T 2207/20084; G06T 2207/30196; G06T 7/0012; H04M 1/724094; H04M 1/72418; G10L 15/18; G10L 15/22; G10L 15/30; G10L 2015/223; G10L 13/00; G10L 15/00; G10L 17/00; G10L 19/00; G10L 21/00; G10L 25/00; G10L 99/00
  USPC ............ 340/436, 439, 447, 449, 454, 457, 340/460–463, 467, 517, 521, 525, 534, 340/539.1, 539.22, 539.24
  See application file for complete search history.

(56) References Cited

U.S. PATENT DOCUMENTS

| | | | |
|---|---|---|---|
| 2020/0184556 A1* | 6/2020 | Cella | G06Q 30/0206 |
| 2022/0230746 A1* | 7/2022 | Anthapur | G16H 40/67 |
| 2024/0282469 A1* | 8/2024 | Steer | G16H 80/00 |

* cited by examiner

SYSTEMS AND METHODS FOR ACCIDENT PREDICTION

CROSS-REFERENCE TO RELATED APPLICATIONS

This application claims priority to U.S. Provisional Patent Application No. 63/383,361, filed on Nov. 11, 2022, the entire contents of which is incorporated by reference herein for all purposes.

TECHNICAL FIELD

The present disclosure relates to monitoring individuals, and in particular to accident prediction.

BACKGROUND

Accidents, and in particular falls, can result in serious injury and even death. There is particularly a devastating impact of falls among elderly people in residential, medical, and institutional care settings. A high proportion of falls among the elderly result in serious injury, causing pain and suffering, lowering life expectancy, and dramatically reducing quality of life for the affected person. Economically, falls among the elderly contribute to high operating costs, operational inefficiencies and staffing challenges in nursing and long-term care homes, and to bed shortages and billions in annual cost to the hospital system.

Currently there are technological and non-technological solutions that attempt to prevent falls amongst the elderly in care settings. Technological solutions include breakaway cables, pressure-pads and other similar products which alert staff with an audible alarm if a resident gets out of bed, as an example. Non-technological solutions include things like falls-awareness training, room preparation (e.g. taping-down carpets, increasing lighting), and exercise.

It would be beneficial to be able to predict accidents before they happen. Accordingly, systems and methods that enable accident prediction remain highly desirable.

SUMMARY

In accordance with one aspect of the present disclosure, a method for predicting an accident is disclosed, comprising: receiving monitoring data from a user device associated with a user, the monitoring data indicative of movement of the user; determining a user action based on the monitoring data using a first artificial intelligence model; and determining a probability of occurrence of one or more potential accidents based on the determined user action and the monitoring data using a second artificial intelligence model.

In some aspects, the method further comprises: generating a notification for a potential accident having a probability of occurrence greater than a threshold probability.

In some aspects, the notification comprises information including the potential accident and the probability of occurrence thereof.

In some aspects, the method further comprises: determining a time before the potential accident is expected to occur, and including the time in the notification.

In some aspects, the notification is sent to an alert device as one or more of: a graphical format, a text format, an audio format, and a vibration.

In some aspects, the method further comprises receiving an identifier of the user associated with the monitoring data, and using the identifier to access a database comprising user-specific data associated with the user, the user-specific data comprising one or more of: an age of the user, a gender of the user, a weight of the user, a height of the user, current health issues of the user; historical health issues of the user, historical accidents of the user, and an accident risk score for the user.

In some aspects, determining the user action is further based on the user-specific data.

In some aspects, determining the probability of occurrence of the one or more potential accidents is further based on the user-specific data.

In some aspects, the method further comprises determining if the user is stationary based on the user action, and when the user is stationary, determining a time that the user has been stationary, and wherein determining the probability of occurrence of the one or more potential accidents is further based on the time that the user has been stationary.

In some aspects, the monitoring data further comprises location data of the user, and the method further comprises: determining a location of the user, wherein determining the probability of occurrence of the one or more potential accidents is further based on the determined location.

In some aspects, the location of the user is outside of an authorized area, and the method further comprises generating a notification indicating that the user is outside of the authorized area.

In some aspects, the monitoring data further comprises biometric data of the user, and wherein determining the probability of occurrence of the one or more potential accidents is further based on the biometric data.

In some aspects, the method further comprises receiving environmental data of a monitoring environment associated with the user, and wherein determining the probability of occurrence of the one or more potential accidents is further based on the environmental data.

In some aspects, the method further comprises, after determining the probability of occurrence of the one or more potential accidents, determining from subsequent monitoring data of the user whether an accident of the one or more potential accidents actually occurred using a third artificial intelligence model.

In some aspects, the method further comprises using an actual occurrence of the accident to further train the second artificial intelligence model.

In some aspects, the method further comprises: receiving feedback from a responsible agent as to whether an accident of the one or more potential accidents actually occurred; and using the feedback from the responsible agent to further train the second artificial intelligence model.

In some aspects, the monitoring data indicative of movement comprises acceleration data in a plurality of directions.

In accordance with another aspect of the present disclosure, an accident prediction system is disclosed, comprising: a processor; and a non-transitory computer-readable medium comprising computer-executable instructions stored thereon, which when executed by the processor, configure the system to perform the method of any one of the above aspects.

In some aspects, the system further comprises a communications hub, the communications hub located remotely from the processor and configured to sent the monitoring data to the processor.

In accordance with another aspect of the present disclosure, a non-transitory computer-readable medium is disclosed comprising computer-executable instructions stored thereon, which when executed by a processor, configure the processor to perform the method of any one of the above aspects.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
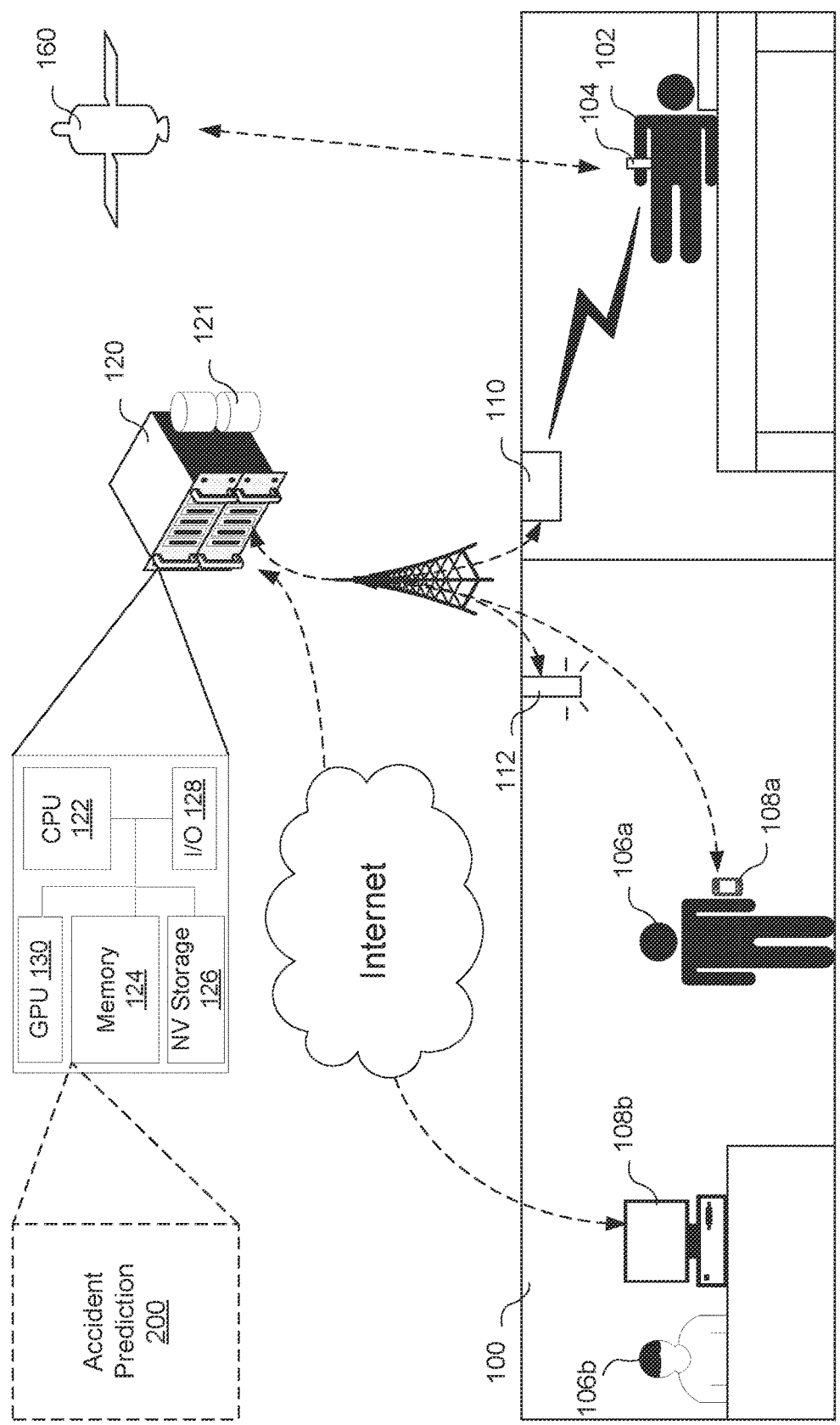
FIG. 1 shows a representation of a system for accident prediction.

Systems and methods in accordance with the present disclosure include techniques for predicting an accident, comprising: receiving monitoring data from a user device associated with a user, the monitoring data indicative of movement of the user; determining a user action based on the monitoring data using a first artificial intelligence model; and determining a probability of occurrence of one or more potential accidents based on the determined user action and the monitoring data using a second artificial intelligence model.

In particular, the systems and methods in accordance with the present disclosure utilize artificial intelligence models that are trained to receive monitoring data obtained from a user device associated with a user and predict accidents that may occur. The system comprises a set of datasets related to movements and accidents plus a series of interpretive and predictive AI models that determine user actions and determine a probability of one or more potential accidents occurring based on the determined user action and associated monitoring data. The AI models function to interpret human movements as belonging to datasets indicating actions or events known to increase risk of accidents/falls, for example 'sitting to standing' or 'getting out of bed', and then predicting the probability of a fall based on research and real-time feedback data for that movement set over time. In this way, and through several data feedback mechanisms, the AI system is a machine-learning system that improves the completeness of the datasets and the accuracy of the algorithms through regular use. The AI algorithms can be tailored to individuals, and adjusted for sensitivity in the prediction of an accident for user-specific parameters (e.g. age, frailty, other health conditions, etc.) making it much more accurate.

Advantageously, the AI systems and methods in accordance with the present disclosure are able to deliver an earlier warning to responsible staff (and possibly the users themselves) of a potential fall or other type of accident, providing adequate time for intervention. For example, by detecting movements associated with getting out of bed, an alert can be delivered to staff well before an elderly and/or sick resident actually gets out of bed (which is when a pressure-pad or break-away cable alarm would sound). Existing solutions of fall detection also contain gaps where an individual can fall and be injured, and nobody will know. By contrast, the systems and methods in accordance with the present disclosure can not only predict accidents, but can also track individuals and their movements (e.g. walking, stooping, ascending stairs, etc.) throughout a facility and helps eliminate the risk of an undetected fall happening. Moreover, movement data can be used to provide a real-time view into the status of the individual being monitored, and may be combined with biometric data such as heart-rate and blood pressure. Accordingly, a responsible person such as a nurse, caregiver, staff member, etc., would be able to see (1) where the resident is (e.g. on a floor map), (2) what activity they are engaged in (movement type); (3) a risk of accident/fall, if any, and (4) any elevated biometric markers that might indicate risk more generally. In some embodiments, if individuals leave a designated area, the system can also flag this and staff will be alerted. Further, classifying and recording movement types over time will provide useful data for reporting and decision-making (e.g. building design, room layout, etc.), as well as care planning for individual residents.

Another drawback with existing technological solutions is that almost all sound audible alarms, which are typically ignored (many ongoing alarms create a constant 'ding' that nurses/staff tune out, and studies find that up to 95% of audible alarms are 'false' in hospital and long-term care settings). In accordance with the present disclosure, alerts can be delivered directly to the appropriate staff/responsible agent, via a smartphone or similar device for example, meaning staff are much more likely to respond. These alerts provided to staff can be risk-stratified and may for example include a percentage probability of a fall, to help staff prioritize their response, whereas the alarms sounded by existing solutions cannot be differentiated, meaning staff cannot properly respond to the areas of highest need.

Also, existing solutions like pressure pads on the floor are also themselves tripping hazards, must be cleaned and disinfected, and take up valuable floor space in resident rooms, whereas the systems in accordance with the present disclosure can utilize off-the-shelf monitoring devices and in some embodiments a small wall-mounted communications hub.

From a cost perspective, the platform, including the AI system, in accordance with the present disclosure can save care facilities, and the health system, considerable costs through (1) avoided purchases of expensive technologies like pressure-pads ($1000+ per bed per year); (2) avoided costs associated with falls response by staff (up to $6000 per incident in staff time alone); (3) more efficient staff coverage due to real-time live monitoring of residents; (4) avoided hospitalization and bed utilization through reduced injurious falls.

There are other advantages provided by the methods and systems disclosed herein as well including novel management information and analytics; process automation including incident reporting; and audit files (data leading to an accident) allowing for better accident prevention over time.

It will be appreciated that while the present disclosure in particular describes the prediction of accidents such as falls in health care settings such as a long term care facility, the systems and methods for accident prediction in accordance with the present disclosure can be used to predict a variety of possible accidents in a variety of environments, including but not limited to other medical settings (e.g. hospitals), residential settings, workplace settings, etc. Users that are monitored to predict accidents may for example be an elderly person, a worker on a job-site, a toddler, a sick person, etc. That is, by collecting movement data and user actions leading up to different types of accidents, the accident prediction model can be trained to predict accidents before they occur. With enough training, the model could even be used to predict things like strains and sprains associated with movements like heavy lifting, walking up stairs, or certain types of exercise. With additional inputs as mentioned above (e.g. environmental and contextual), the models could also predict certain workplace accidents like those associated with fatigue (e.g. heavy equipment accidents, driving accidents, etc.).

Embodiments are described below, by way of example only, with reference to FIGS. 1-6.

FIG. 1 shows a representation of a system for accident prediction. In FIG. 1, monitoring environment 100 is shown as comprising a user 102 (e.g. a patient) that is being monitored, and one or more responsible agents 106a, 106b, that are responsible for monitoring the user 102. Again, the monitoring environment 100 shown in FIG. 1 is provided solely for the sake of example, and the systems and methods for predicting accidents in accordance with the present disclosure are not limited to this environment.

The user 102 has an associated a user device 104 recording monitoring data about the user 102. In this example, the user device 104 may for example be a wearable device, however the present disclosure is not limited to such a user device 104. In general, however, the user device 104 records monitoring data about the user 102 that is indicative of the user's movement, and may in particular capture movement, acceleration, and direction. Accordingly, the user device 104 may comprise an accelerometer, although other user devices with alternative means of collecting data about the user's movement are possible, such as devices comprising a gyroscope, or one or more infrared cameras. The user device 104 may also have GPS capabilities, as for example indicated by the interaction with GPS satellite 160, to record a location of the user for inclusion in the monitoring data. The user device 104 may also comprise one or more biometric sensors configured to measure biometrics of the user such as heart rate, blood pressure, etc., for inclusion in the monitoring data.

The user device 104 is configured to be in wireless communication (e.g. via Bluetooth) with a hub 110 to communicate monitoring data of the user (which may for example also include GPS data of the user device). The hub 110 may have Wi-Fi or SIM connectivity, allowing the monitoring data to be transmitted to a server 120 for analysis via the Internet or a telecommunications network. The hub 110 may also generate and send monitoring data, indicative for example of whether the user device is in communication with the hub 110, and therefore being used to locate the user within the monitoring environment 100. The monitoring data is also associated with a user identifier that allows for identifying the user 102. It is also possible that certain user devices may communicate directly with the server 120 without sending data through the hub 110, however these devices are typically larger and may not be appropriate depending on the monitoring environment.

The server 120 is configured to analyze the monitoring data and predict a probability of an accident occurring. The server 120 may comprise a group of servers, and may be distributed (cloud service). The server 120 comprises hardware components including a processor, e.g. CPU 122, a non-transitory computer-readable memory 124, a non-volatile storage 126, and an input/output interface 128. The non-transitory computer-readable memory 124 has computer-readable instructions stored thereon at runtime which, when executed by the CPU 122, configure the server 120 to perform certain functionality as described herein. In particular, the non-transitory computer-readable memory is configured to cause the server 120 to perform a method of predicting an accident, as for example further described with reference to FIG. 2. As further described herein below, the memory stores AI models that are used for implementing the method, including a model for identifying user actions, a model for accident prediction, and a model for accident detection. The server 120 may also comprise graphical processing unit(s) (GPU 130) to control a display and to run the AI models. Monitoring data may be received from the hub 110 (or the user device 104 directly) via the I/O interface 128, and the server 120 is also configured to output notifications/alerts to various devices through the I/O interface 128. Accordingly, the I/O interface 128 may comprise a communications interface allowing the server 120 to communicate via the Internet and/or a cellular network (e.g. SMS messaging). It will be appreciated that there may be multiple servers 120 implemented to perform the accident prediction methods. Multiple servers 120 may be networked together and collectively perform the accident prediction method using distributed computing.

When implementing the method of predicting an accident, the server 120 is configured to receive monitoring data of the user (e.g. from the hub 110), and detect movement associated with the user 102. The server 120 uses AI models to classify the movement as a user action and to compute a probability of an accident occurring based on the user action and the monitoring data. For example, if the server 120 detects that the user 102 is getting out of bed, the server 120 is configured to determine a probability of one or more potential accidents associated with that movement (e.g. a probability of the user falling). As described above, in addition to movement data (e.g. acceleration data in a plurality of directions), the monitoring data may comprise location data, biometric data, etc., which may also be used to determine user actions and probabilities of accidents occurring (e.g. someone staggering in a bedroom may have a lower probability of falling than someone staggering in a bathroom). Other information in addition to the monitoring data may be used to predict the probability of an accident occurring, such as environmental data of the monitoring environment and/or user-specific data (e.g. stored in a database 121 accessible by the server), which may for example contain age, gender, health conditions, and other data that is used to filter and improve the fall probability.

When the server 120 predicts that there is a high probability of an accident occurring (e.g. the probability is greater than a threshold value), the server is configured to generate and send an alert to one or more devices associated with individuals responsible for the user 102, and may send an alert to the user 102 themselves, e.g. through the user device 104 collecting monitoring data or another device (not shown). For example, the server 120 may send a notification to a mobile phone 108a, e.g. via a platform and app push notification or text message. The server 120 may additionally or alternatively send an email or an instant notification to a computer 108b. The server 120 may additionally or alternatively trigger one or more alarms, such as alarm 112. Accordingly, the responsible individuals 106a and 106b may be able to intervene and prevent an accident from occurring, and/or the user 102 may be notified of their risk of accident and stop their current action. The information provided in a notification may also include the probability of the accident occurring and other information allowing the responsible individuals 106a and 106b to respond appropriately.

Figure 2:
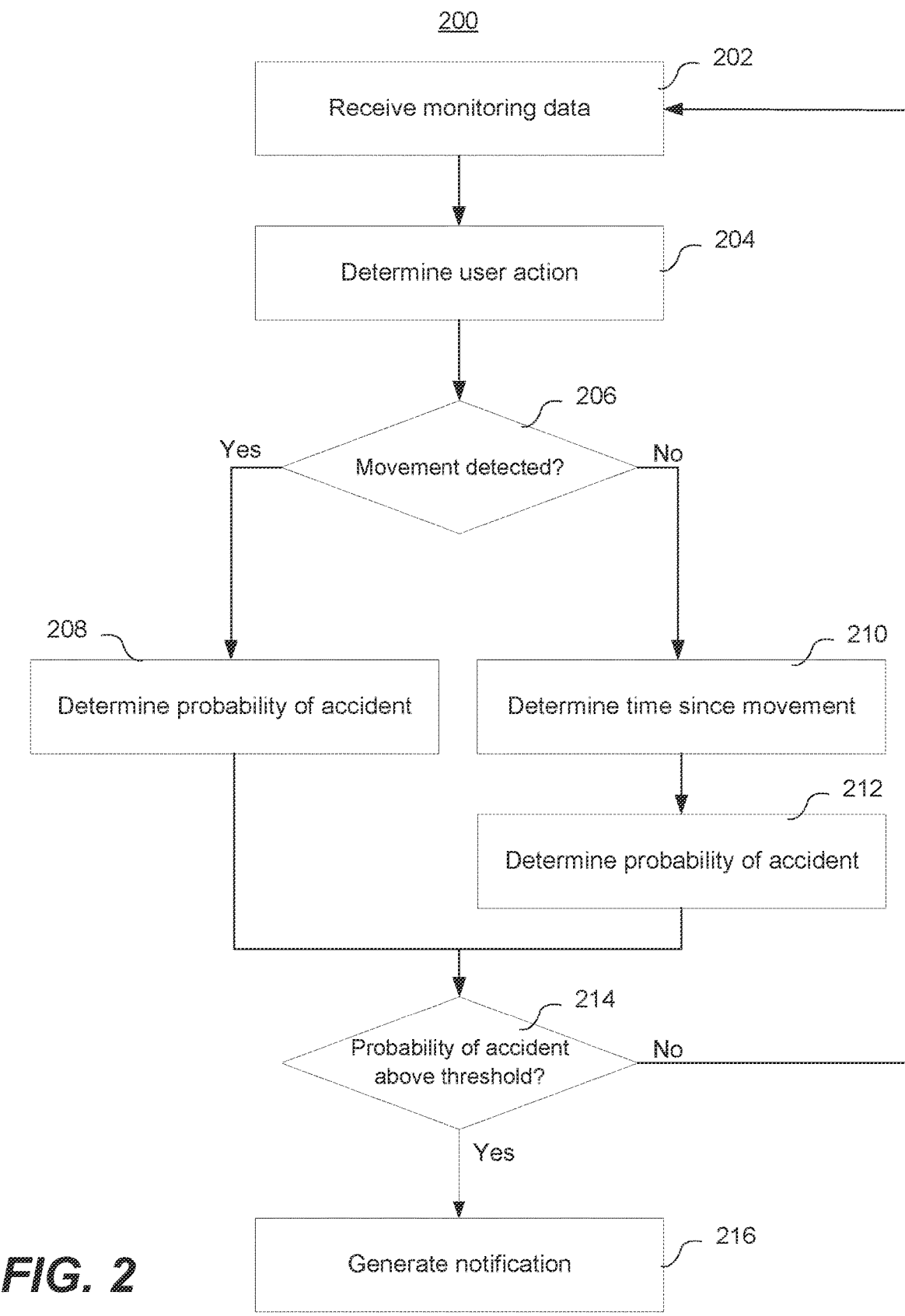
FIG. 2 shows a method of predicting an accident.

FIG. 2 shows a method 200 of predicting an accident. The method 200 may be performed at the server 120, as described with reference to FIG. 1. The method may be performed in real-time or near real-time to timely predict accidents and provide time to prevent accidents from occurring.

Method 200 comprises receiving monitoring data (202) from a user device associated with a user, such as user device 104. The monitoring data is indicative of movement of the user, and may also comprise location data, biometric data, etc. As described above, the user device 104 may be a personal wearable device with an accelerometer sensor and Bluetooth transmission. The user device 104 may be commercial off the shelf (COTS). In the example where the user device 104 comprises an accelerometer, the monitoring data may comprise acceleration data of the user in a plurality of axes/directions. The monitoring data may be received continuously, and the movement data received even if the user is stationary (e.g. sitting, standing, lying down, etc.)

The method 200 determines a user action (204) based on the monitoring data using a first artificial intelligence model. The first artificial intelligence model is trained to classify user actions or user states from the movement data. For example, it may be determined that the user is walking, walking quickly, running, climbing steps, jumping, bending over, straightening up (from bending over), picking up/lifting an object, sitting, standing, lying down, etc. In still other cases, it may be determined that the user is transitioning between positions or states, such as lying down to sitting up; rotating and swinging legs; sitting to standing; turning while walking; standing to sitting; sitting to lying down, etc. Staggering and falling movements can also be detected, which can be determined to be one of several categories of staggering/falling movements, such as injurious falling movement, non-injurious falling movement, falling back, falling forward, etc. The user action is determined according to the movement in the monitoring data and any additional monitoring data. The movement may be labelled according to the user action, such that movements labelled as a user action that is expected to lead to an accident such as falls, wandering, bed sores, etc. can be readily identified. For example, various types of staggering movements, movements that occur as part of getting out of bed (e.g. lying down to sitting, rotating and swinging legs, sitting to standing, etc.), wandering movements, and/or user actions where a user may be stationary for prolonged periods, may be of particular interest. In some embodiments, only user actions that are expected to lead to an accident may be passed to accident prediction AI model described below. Also, the user action determined by the first AI model may itself be output to responsible staff and/or monitoring devices. As described above, real-time monitoring of individuals may be provided by tracking user actions, possibly in combination with location data, etc.

A determination may be made as to whether movement is detected in the monitoring data (206). Detecting movement may be of interest because a user that is stationary (e.g. sitting or lying down) for prolonged periods may be at risk of accidents caused by lack of movement. That is, a user may be at risk of different types of accidents depending on whether they are moving vs. whether they are stationary. Detecting movement at 206 may be based on the user action determined by the first AI model (e.g. if it classifies the user action as sitting or lying down), and/or by analyzing the movement data in the monitoring data by comparing axial accelerations through time against a movement threshold.

When movement is detected (YES at 206), the method 200 determines a probability of occurrence of one or more potential accidents (208) using a second AI model based on the determined user action and the monitoring data. Examples of potential accidents may comprise falling down, wandering, etc. Based on the determined user action, one or more potential accidents may be predicted each with a specific probability of occurrence. For example, a probability that a user who is staggering is going to fall can be determined based on the user action (i.e. staggering) and the monitoring data, which includes movement data (e.g. a large amount of staggering can be identified vs. a small amount of staggering based on the magnitude of the acceleration data), and may also include location data (e.g. staggering in a bathroom may lead to a higher probability of a fall than staggering in a bedroom) and biometric data (e.g. low blood pressure may lead to a higher probability of a fall due to staggering). Other data, such as user-specific data and/or environmental data, may also be obtained/received and also used to determine the probability of falling, as described further below. Similarly, a probability that a user that is walking is wandering may be determined based on the user action (i.e. walking) and the monitoring data, including movement data (e.g. a user that is walking slowly may be more likely to wander than a user that is walking briskly), and possibly location data (e.g. if the user is leaving a certain physical location).

When movement is not detected (NO at 206), the method 200 may collect or determine additional data, such as determining a time since a last movement of the user (i.e. by comparing the acceleration data against a movement threshold value) (210), or in other words, determine how long the user has been stationary. A probability of occurrence of one or more potential accidents is determined (212) using the second AI model based on the determined user action, the monitoring data, and the time since the last movement of the user. For example, a patient that is lying down and has not moved for a prolonged period of time may be at risk of bed sores. In addition to determining a time since a last movement of the user, the method may determine a number of movements of a particular type while the user has been in a particular state (e.g. a number of times the user has turned over while lying down). The number of these movements during the otherwise stationary period may also be provided to the second AI model for use in determining a probability of one or more potential accidents occurring.

The first and second AI models are trained on monitoring data collected from real-world monitoring data that is obtained from individuals and associated monitoring devices over a set period of time in a given environment. The movement data, user actions, and any subsequent accidents may be manually labelled. A camera may be used to record movements and user actions, as recordings will enable highly-precise association of movements of the user to the readings of the device. After initial training, movement data may continue to be stored and user actions and accidents evaluated to provide feedback and continuous training of the first and second AI models. The feedback may be provided by staff using an application, as well as possibly video data and/or other movement/accident confirmation data (e.g. from other equipment that can be used to confirm a user action and/or accident). Moreover, as described below, a third AI model may be used to evaluate subsequent monitoring data of the user and determine whether an accident actually occurred, and to provide that result for training the first and/or second AI models.

Using a first AI model for determining a user action and a second AI model for determining a probability of occurrence of one or more potential accidents has several advantages. For example, not only can the output of the first AI model be output independently of the second AI model as noted above, but there are also accuracy and efficiency benefits with the use of two models. Improved accuracy is achieved because each model is trained for a specific task. Efficiency is achieved because over time, the data from the first model can be filtered before being fed into the second model (the prediction model). For example, only data that is relevant to accident prediction may be input/processed by the second AI model for accident prediction. If it is determined through model use and repetition that certain actions are unlikely to lead to a fall accident, they may be filtered out from being input into the second model. For example, if the first model determines that an individual is walking normally and in a straight line, and the user data associated with the individual indicates that they are healthy, the probability of an accident from previous model determinations may be so low that the user action and monitoring data is not passed to the second AI model for predicting a likelihood of an accident occurring. Therefore, by filtering out data that is not likely to lead to an accident, computing resources can be used more efficiently.

A determination is made as to whether a probability of a potential accident occurring determined at 208 or 212 is above a threshold (214). A non-limiting example of a threshold value may for the sake of example be a 70% probability of a potential accident occurring. However, it will be appreciated that different threshold probabilities may be set, and that the threshold probability may be tuned to balance false positive notifications with failing to send a notification and an accident actually occurs. If the probability is not above a threshold (NO at 214), then the accident is unlikely to occur and the method continues to receive monitoring data at 202. If the probability is above the threshold (YES at 214), a notification is generated, which may be sent to one or more of the devices 104, 108*a*, 108*b*, etc. The notification may for example be in a graphical format (e.g. map or other image with information for response), text format, an audio format, a vibration, etc. Where notifications are sent to the user being monitored, the notification can be tailored to the person, e.g. including vibrations or audible notifications that could include voice recordings may be sent to dementia patients. In some embodiments, the generated notification may comprise the one or more potential accidents and the probability of occurrence thereof. If a plurality of the one or more potential accidents are associated with a probability of occurrence greater than a threshold probability, the notification may order the plurality of the one or more potential accidents according to their associated probability of occurrence. In some embodiments, a potential accident having a highest probability of occurrence may be provided in the notification. It is to be understood that depending on the gravity of the potential accident, different threshold probabilities may be set.

In some embodiments, the second AI model may also predict a time period before the potential accident is likely to occur. The notification may also include the time period remaining until the potential accident occurs, where the time period is a finite time period following the detected movement having the highest probability of occurrence of the potential accident. For example, the time period before the occurrence of the potential accident is typically between 30 seconds and 5 minutes from the moment the movement associated with the user action has been detected.

In some embodiments, the monitoring data includes or is associated with an identifier of the user (e.g. based on a device identifier, etc.) and the server 120 has access to the database 121 comprising user-specific data associated with the user identifier. The user-specific data may be divided into three main categories: historical accident data of the user, historical monitoring data of the user, and personal data of the user. Historical accident data may comprise a history of accidents/falls of the user, as well as a time of the accidents, etc. Historical monitoring data of the user comprises the monitoring data received for the user, which may be continuously updated. Historical monitoring data stored for the user may be periodically updated to remove ancient data. For example, periods of time where no movement was detected and no accident was predicted may be removed from the database in order to optimize storage. Personal data of the user may comprise one or more of: age of the user, gender of the user, weight of the user, height of the user, mobility, current health issues of the user (e.g. including recent medications or diagnoses); a frailty level of the user, historical health issues of the user, and an accident/fall risk score which may be provided by the facility that the user is located. The user-specific data may also comprise contextual data (e.g. past 24-hours drug intake, food intake, sleep levels, etc.). The user-specific data may be provided to the server periodically. Additionally or alternatively, other user-specific data may be provided to the server 120 along with the monitoring data in real-time, such as blood pressure data from a blood pressure sensor, etc.

In some embodiments, the different types of data may be stored in different parts of the database 121. For example, personal data of the user may need to be stored in a database having higher security standards in order to ensure data protection.

The user-specific data may be used by the first and/or second artificial intelligence models in conjunction with the monitoring data to determine the user action and/or compute a probability of an accident occurring. For instance, determining the user action may profit from insights related to the user's health. For example, in cases where based on the monitoring data, the first artificial intelligence model would determine that the user trying to stand up, knowing that the user is paraplegic will allow the algorithm to discard standing up and therefore determine another user action. In a further embodiment, the probability of occurrence of the one or more potential accidents is further computed using the user-specific data. That is to say, the second artificial intelligence model may use the user-specific data in conjunction with the monitoring data and the determined user action to compute the probability of occurrence of one or more potential accidents. This allows a better prediction of the potential accidents. For instance, the probability of occurrence of one or more potential accidents for a detected movement associated with standing up for a user suffering from low blood pressure may be higher than for a user not suffering from low blood pressure. Therefore, the second artificial intelligence model should output a higher probability of occurrence of an accident for the user suffering from low blood pressure. As another example, a user that has recently switched medications may be at higher risk of a potential accident occurring.

In still further embodiments, the server 120 may also receive contextual/environmental data from the monitoring environment, such as a time of day, location within the facility, ambient lighting (e.g. with use of a photo-sensor), ambient noise levels, etc., and this contextual/environment data may be used in the first/second artificial intelligence models to classify the user action and/or compute a probability of a potential accident.

In another embodiment, monitoring data may further comprise location data of the user. In this case, method 200 may further comprise determining a location of the user. The location of the user may also be used to predict the probability of occurrence of the one or more potential accidents. The location of the user may also be used to generate a notification if the location is outside of an authorized area, which may be determined from the GPS data, and/or from a lack of Bluetooth connectivity with a hub, such as hub 110.

The method 200 may further comprise upon predicting one or more potential accidents, determining from subsequent monitoring data of the user and whether the potential accident actually occurred using a third artificial intelligence model. The third artificial intelligence model may be trained using user data from a similar population corresponding to that of the user 102. In this manner, the third artificial intelligence model is more accurate for detecting accidents among the population, compared to generic fall detection. In this case, method 200 may also comprise using actual occurrence of the potential accident to further train at least one of the first and second artificial intelligence model. That is to say, actual occurrence of the potential accident is used as a feedback to enhance the first and/or second artificial intelligence model. The third artificial intelligence model for accident detection may be a supervised model that is able to confirm if the user has experienced an accident, and in addition to the monitoring data, may use user-specific data, contextual/environmental data, and/or location data.

In some embodiments, feedback from a responsible agent as to an accuracy of the one or more potential accidents may also be available. When this is the case, method 200 may also use the feedback to further train the first and/or second artificial intelligence models. The staff or a responsible agent (i.e. a person monitoring or responsible for the user) may have an application on their devices with a user interface that is in communication with a server (e.g. server 120) and configured for receiving a probability of occurrence of one or more potential accidents. Staff may also have an application interface that allows them to confirm or correct movement type, accident type, and injury, based on their real-world observation as part of their regular workflow. The application interface may provide a pop-up when the staff is in proximity to the user (i.e. as automatically detected by the platform). For example, the staff must respond to all fall prediction notifications and confirm whether a fall indeed took place (along with the type of fall and whether there was an injury), whether the alarm was a near-miss (e.g. a stagger without a fall), or whether the alarm was a false-positive (the AI mistaking a non-fall movement for a fall).

Figure 3:
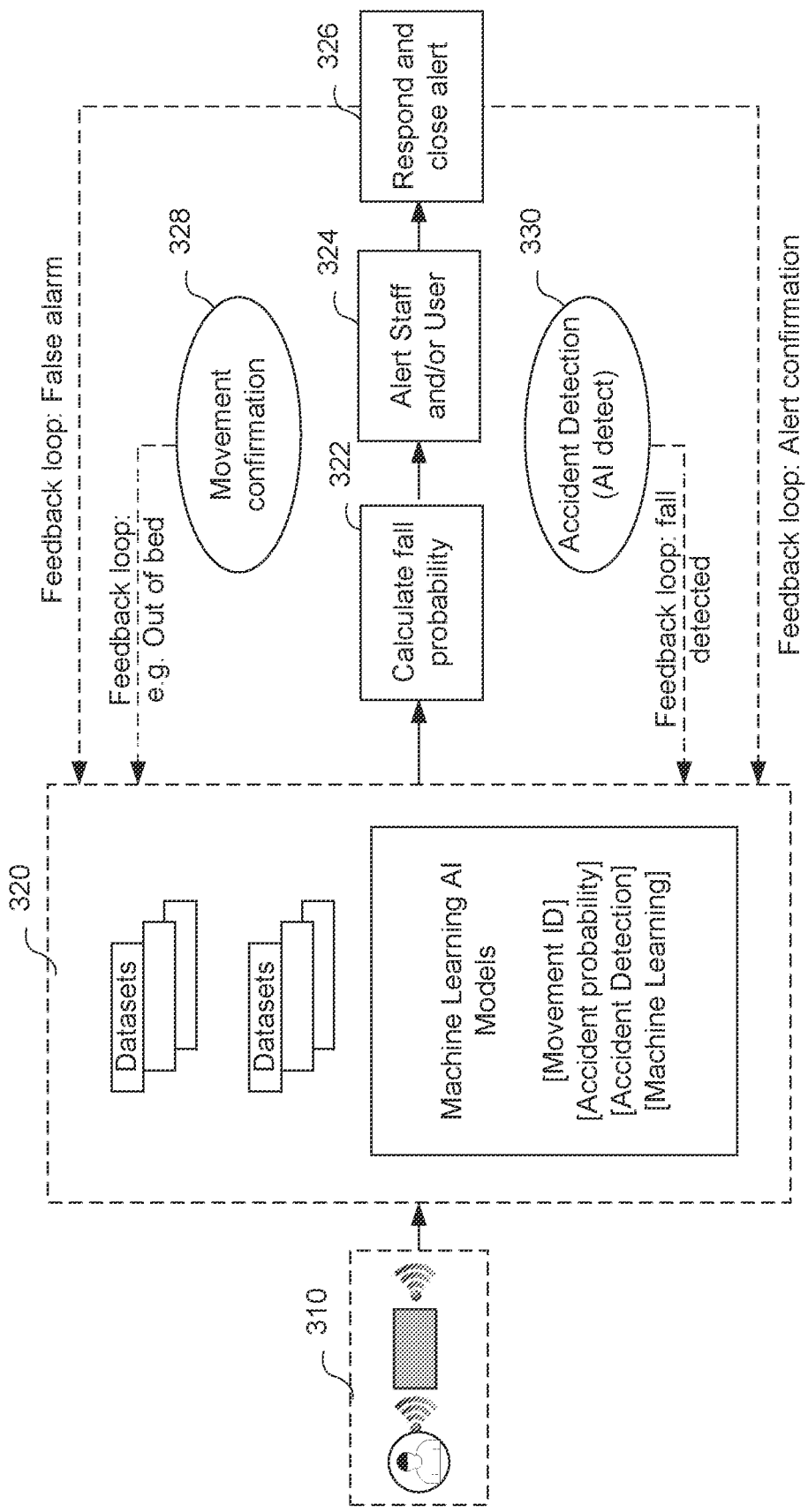
FIG. 3 shows a flow diagram for predicting an accident.

FIG. 3 shows a flow diagram for predicting an accident. As explained in accordance with FIGS. 1 and 2, the user device 104 transmits 310 monitoring data via hub(s) 110 to a server 120 that performs accident prediction. The system may use certain hardware including for example (1) personal wearable devices with at least an accelerometer and communication capabilities (e.g. for Bluetooth transmission); and (2) a communications hub (e.g. with WiFi and SIM connectivity) to process monitoring data and transmit to the server, as described above. The user device and/or the communications hub may be commercial-off-the-shelf products.

As indicated at 320, the server has access to various datasets, which may include training datasets comprising historical monitoring data leading to accidents, as well as datasets with user-specific data, and also has stored thereon algorithms and AI models for performing accident prediction, including to identify/detect movements (i.e. determine user actions), determine a probability of an accident occurring, and detecting accidents.

The probability of an accident is calculated (322) using first and second AI models as described above. When the probability of an accident exceeds a threshold, a notification is generated to alert staff and/or the user (324). The staff/user may then respond to the alert (326) and provide feedback as appropriate (e.g. whether the alert was a false alarm or whether the alert is confirmed to be correct/appropriate). The staff/user feedback may be provided into an application as described above.

The staff/user feedback may be added to training datasets used to further train the first/second AI models. In addition, movement confirmation (328), e.g. from videos, hubs, etc., that are configured to capture user movements may be provided as feedback and added to the training datasets. Further, monitoring data received from the user device may be input to the third AI model to detect whether an accident actually occurred (330), and may be used in a feedback loop to train the models. Accordingly, the systems and methods in accordance with the present disclosure provide for several types of feedback mechanisms to update the training datasets and continuously train/update the models.

Figure 4:
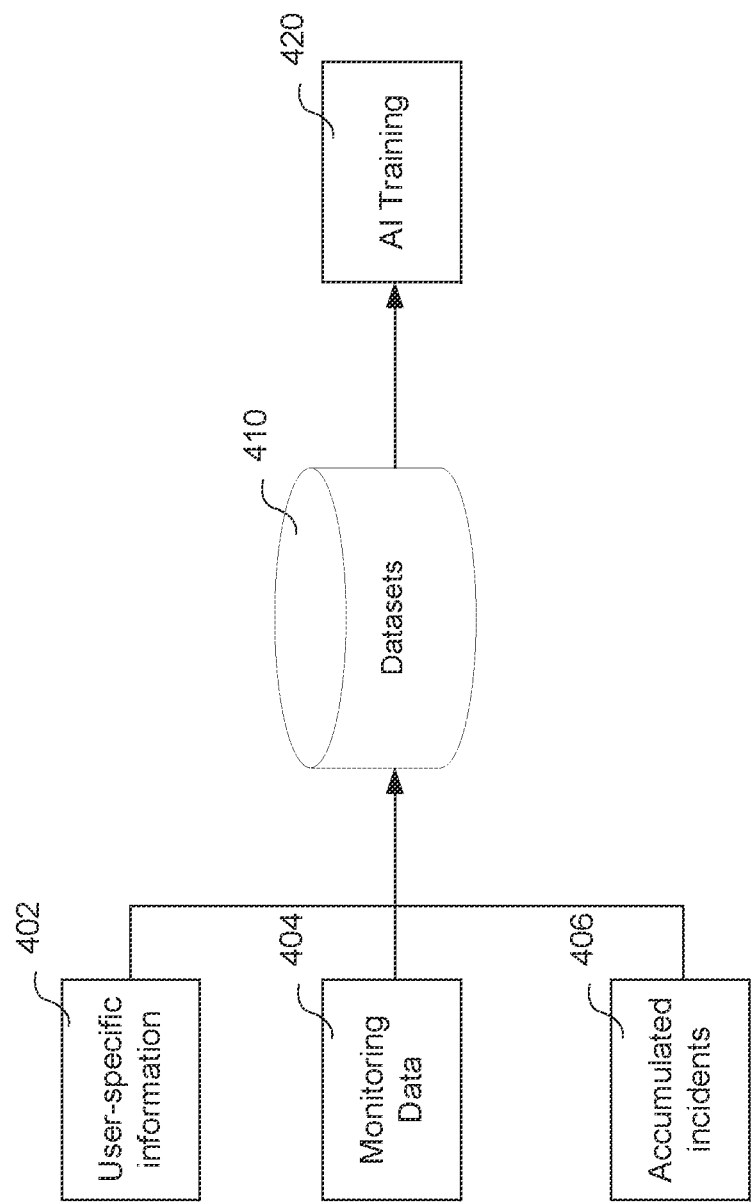
FIG. 4 shows a general architecture for training the artificial intelligence models.

FIG. 4 shows a general architecture for training the artificial intelligence models. Various datasets are stored in a database 410 for use in training the AI models at 420. The training data includes user-specific information 402, monitoring data 404, and data on accumulated incidents 406.

The training datasets are populated with real world data from a setting, such as long-term care, and may comprise data collected from a training period as well as ongoing data collection during a monitoring period. That is, data collection can be an ongoing task with users of the system in order to obtain more data on which the artificial intelligence models will be trained. Data collection may therefore be both supervised and unsupervised, as explained below.

The training data may be preprocessed to filter out noise. Feature extraction may also be applied to the training data to extract features for training the artificial intelligence models as part of a preprocessing step. Different preprocessing and feature extraction may be applied to the different types of training data. For example, features that may be extracted from movement data may include:
(i) Frequency-Domain Features, Such as:
Fast Fourier Transform (FFT) to extract frequency domain information;
Dominant frequency or frequency components;
Power spectral density;
Spectral entropy and spectral flatness; and
Frequency band power ratios (e.g., ratio of energy in different frequency bands);
(ii) Wavelet Features, Such as:
Features derived from wavelet transform coefficients, which can capture both time and frequency information simultaneously;
(iii) Energy-Related Features, Such as:
Total energy, energy in specific frequency bands, and energy distribution across different axes;
(iv) Orientation and Magnitude Features, Such as:
Features that describe the orientation of the device or body segment in space; and Features based on the magnitude of sensor readings; and (v) Statistical Moments in Time Series Data, Such as:

Higher-order statistical moments like skewness and kurtosis can provide insights into the distribution of data points over time.

As explained above, a first artificial intelligence model is trained for determining a user's action based on movement in the monitoring data and any other data included in the monitoring data, as well as user-specific information where available. The second artificial intelligence model is trained for determining a probability of an accident occurring based on the user's action and the monitoring data, as well as user-specific information where available. In the example where the user is an elderly person in health care organization, the second artificial intelligence model may particularly be useful for fall probability prediction. A third artificial intelligence model is trained for detecting accidents based on monitoring data and user-specific information. The third artificial intelligence model may thus be used for accident detection and detected accidents can be added back to the datasets as accumulated incidents and used as feedback to continuously train the first and/or second artificial intelligence models.

The artificial intelligence models are custom-built models developed to determine user actions and to determine a probability of one or more potential accidents occurring. The artificial intelligence models may be neural networks. In an example, the neural networks comprise 2D convolution layers. As an example, the AI algorithm for the first model may be designed as follows:

1. Create a sequential model;
2. Add a convolution 2D layer using relu (rectified linear units);
3. Add a dropout layer;
4. Add a convolution 2D layer using relu;
5. Add a dropout layer;
6. Flatten the data;
7. Add a dense layer using relu;
8. Add a dropout layer;
9. Add a dense layer using softmax; and
10. Compile the model.

The data input to the first artificial intelligence algorithm comprises monitoring data (404) as well as user-specific data (402) where available. The collected monitoring data may be preprocessed using a high pass filter to filter out bodily noise. The first artificial intelligence model is trained to label movement(s) in the monitoring data to determine a user action.

In an example where the user is an elderly person in health care organization, the movements detected using the monitoring data may be labeled with labels based on user actions so that user actions can be readily identified that are expected to lead to accidents/falls. Examples of user actions that may lead to accidents include various types of 'staggering', or the types of movements that occur as part of getting out of bed. It will be appreciated that various types of user actions can be identified in the movement data that may be useful to predict a probability of an accident occurring. Training data labels may include: laying to dangling; dangling to laying; laying to sitting; sitting to laying; sitting to standing; out of bed to wheelchair; standing to sitting; walking; sitting and picking up; toilet to wheelchair; wheelchair to toilet; wheelchair scooting with feet; bending and picking up; walking with a walker; walking with a cane; wheelchair scooting with hands; thrashing; standing to sitting on walker; climbing out of end of bed; wheelchair to commode; sitting to standing on walker, etc.

The training data of the second and third artificial intelligence model may comprise previously determined user actions and monitoring data (404) as well as user-specific data (402) and data on accumulated incidents (406) that has been preprocessed and labeled. As part of the labeling process, the previously determined user actions and the monitoring data may be classified into two categories based on the accumulated incidents: accident or no accident. In some embodiments, user actions that are labelled as corresponding to an accident may be further labelled according to specific types of accidents, severity of accidents, etc. Accordingly, the second artificial intelligence model is trained to determine a probability of a potential accident occurring, or possibly a respective probability of one or more potential accidents occurring, from the determined user action and any user-specific data. The second AI model can also be trained to predict a time before the accident(s) are expected to occur, by looking at patterns from falls (e.g. the 2-3 minutes immediately prior) to determine movement patterns leading to falls and time between that movement pattern and the time that the fall occurred. The third artificial intelligence model is trained to determine when an accident has occurred based on the monitoring data and possibly the user-specific data.

Training of the first artificial intelligence algorithm and the third artificial intelligence model may be supervised. That is, during training, the third artificial intelligence algorithm is told that a fall occurred. The first artificial intelligence algorithm is also told what the movement/user's action was. Training the second artificial intelligence algorithm (i.e., accident probability) may be unsupervised. Information from the first and third artificial intelligence models, plus any feedback data (e.g. from staff) is used to train the second artificial intelligence algorithm to predicting an accident.

Figure 5A:
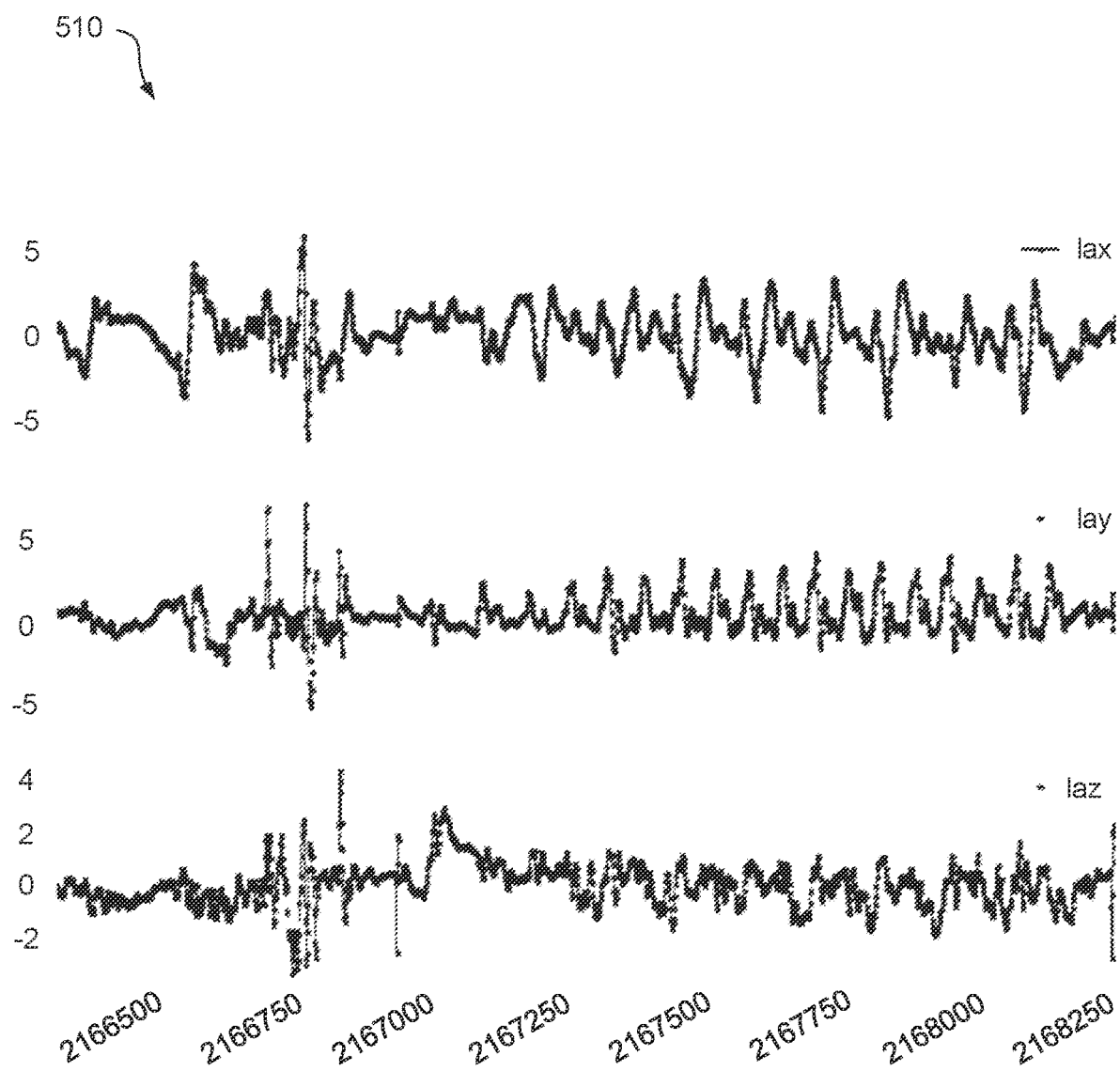
FIGS. 5A-H show examples of acceleration data classified by the artificial intelligence model as different movements.
Figure 5B:
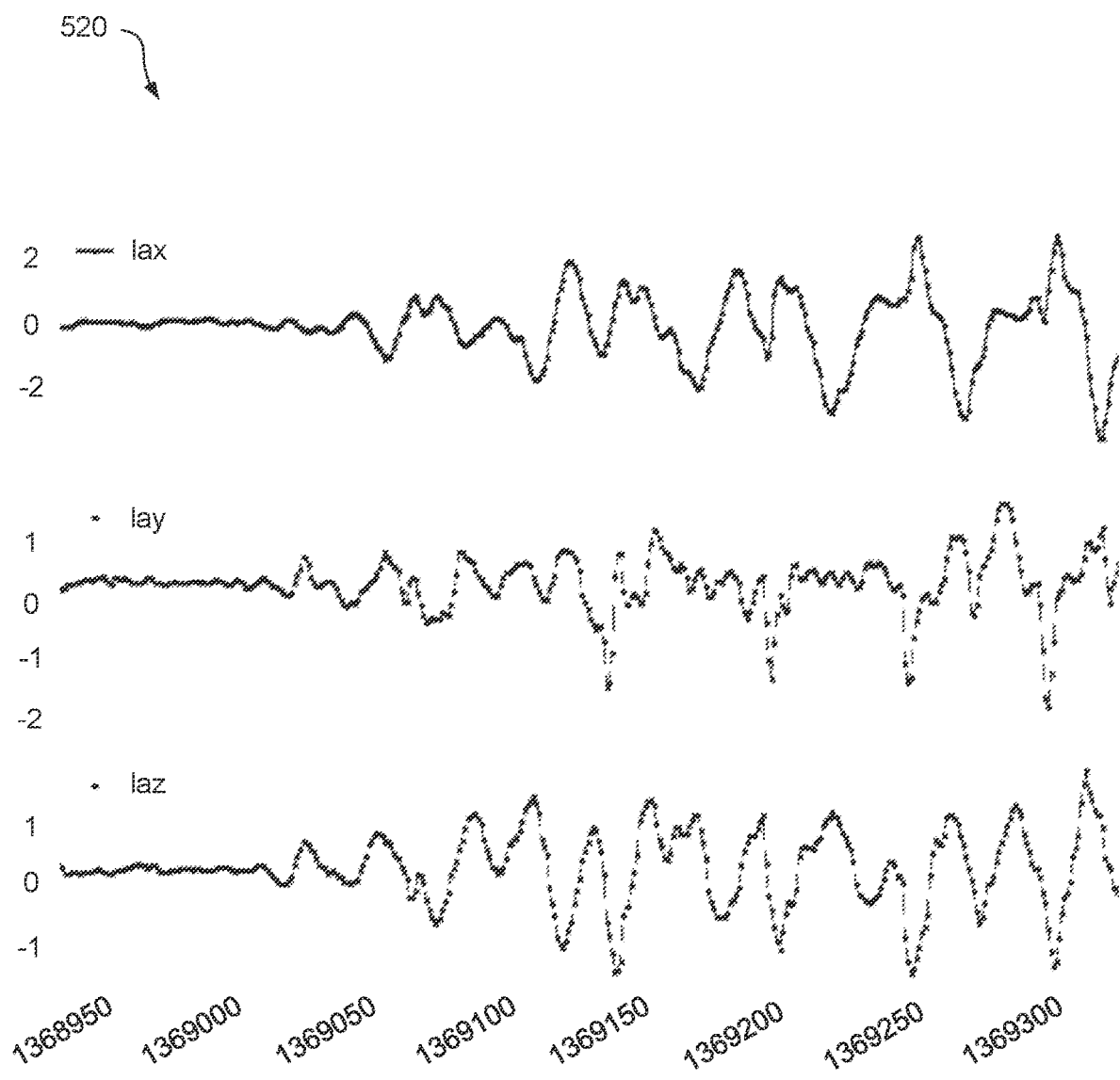

FIGS. 5A-H show examples of acceleration data classified by the artificial intelligence model as different movements. Referring to FIG. 5A, the graph 510 shows acceleration data in the x (top data), y (middle data), and z (bottom data) directions respectively, obtained from an accelerometer associated with a user that is walking. Referring to FIG. 5B, the graph 520 shows acceleration data in the x (top data), y (middle data), and z (bottom data) directions respectively, obtained from an accelerometer associated with a user that is using a wheelchair.

Figure 5C:
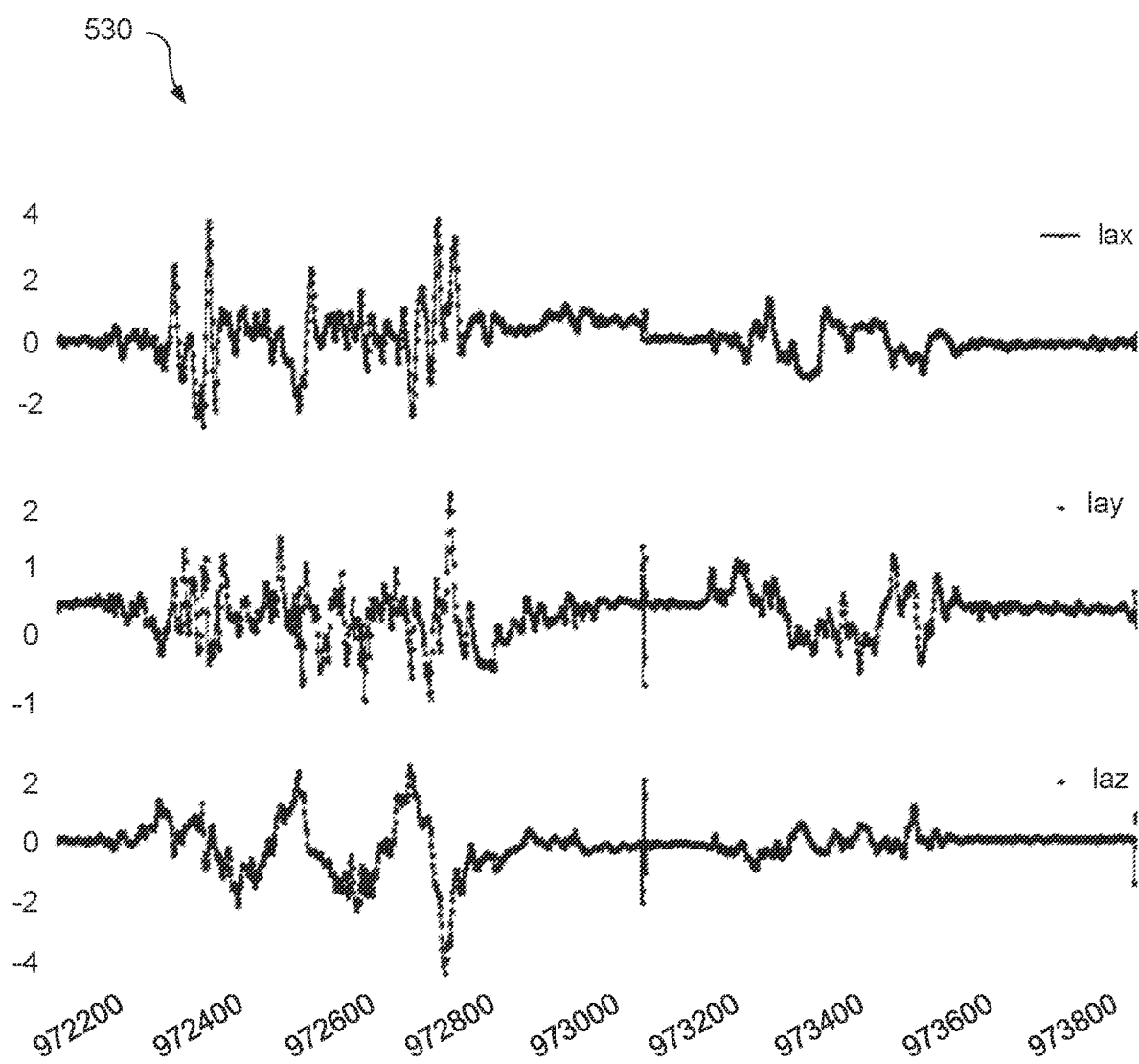
Figure 5D:
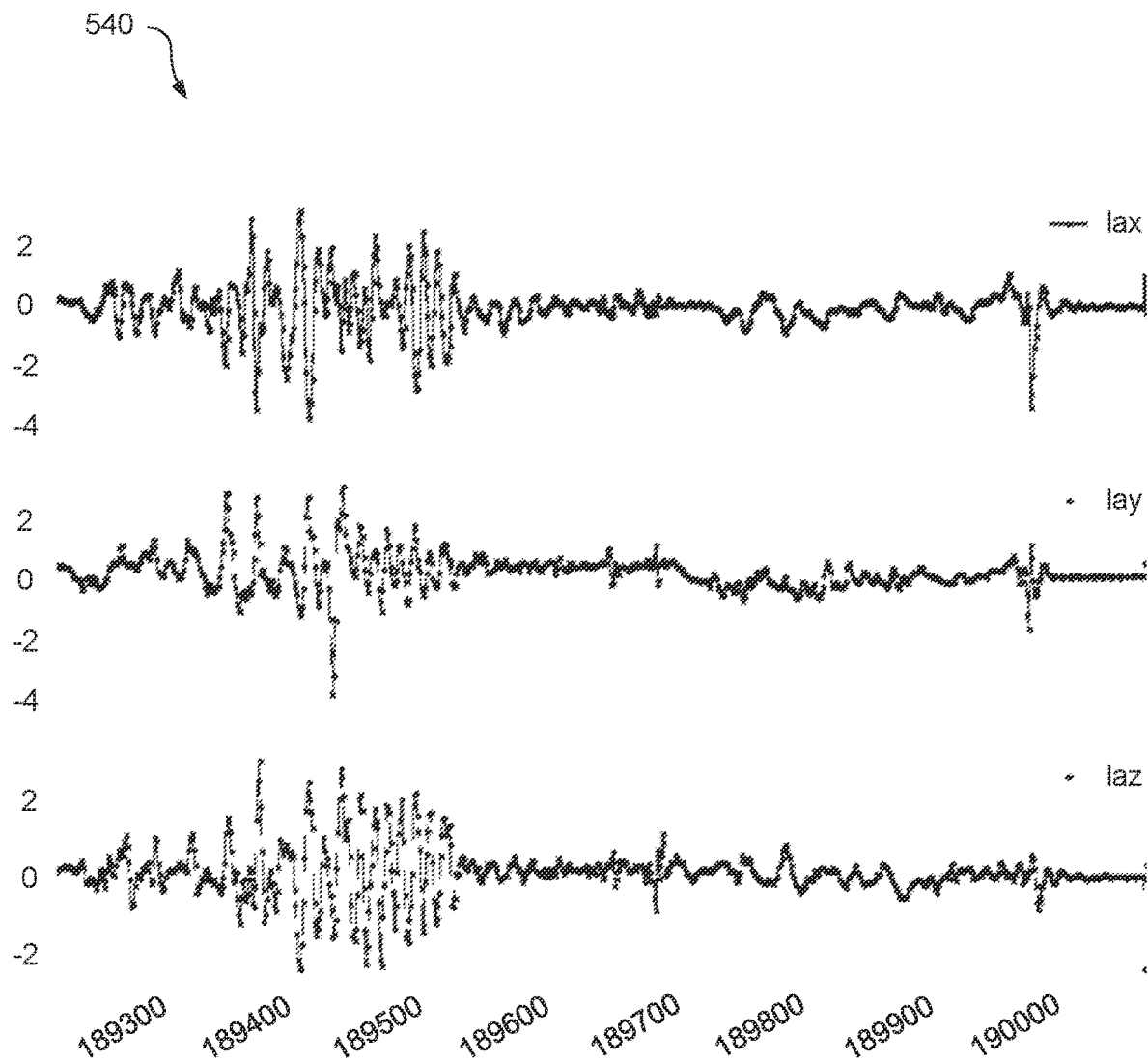
Figure 5E:
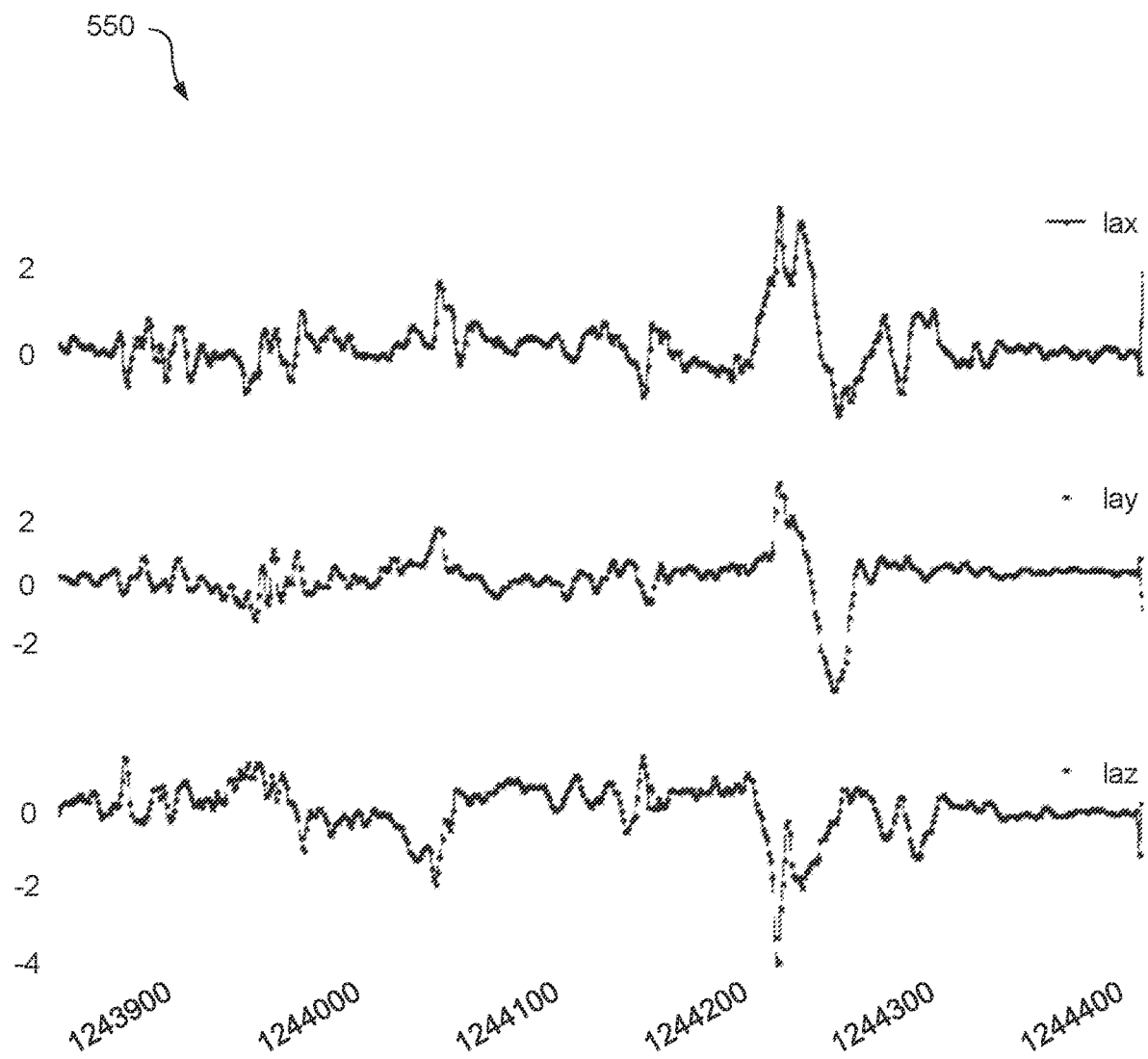
Figure 5F:
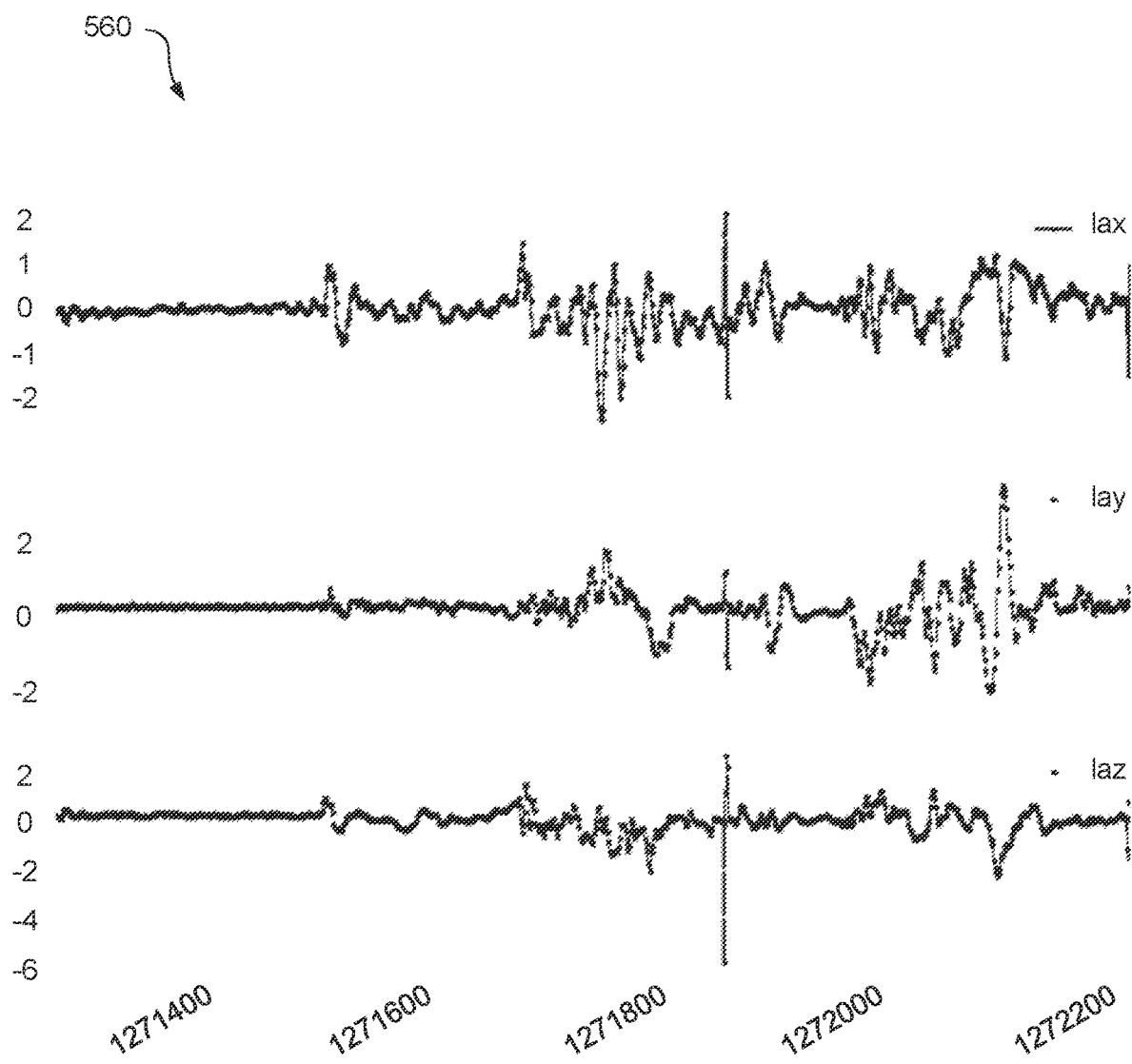
Figure 5G:
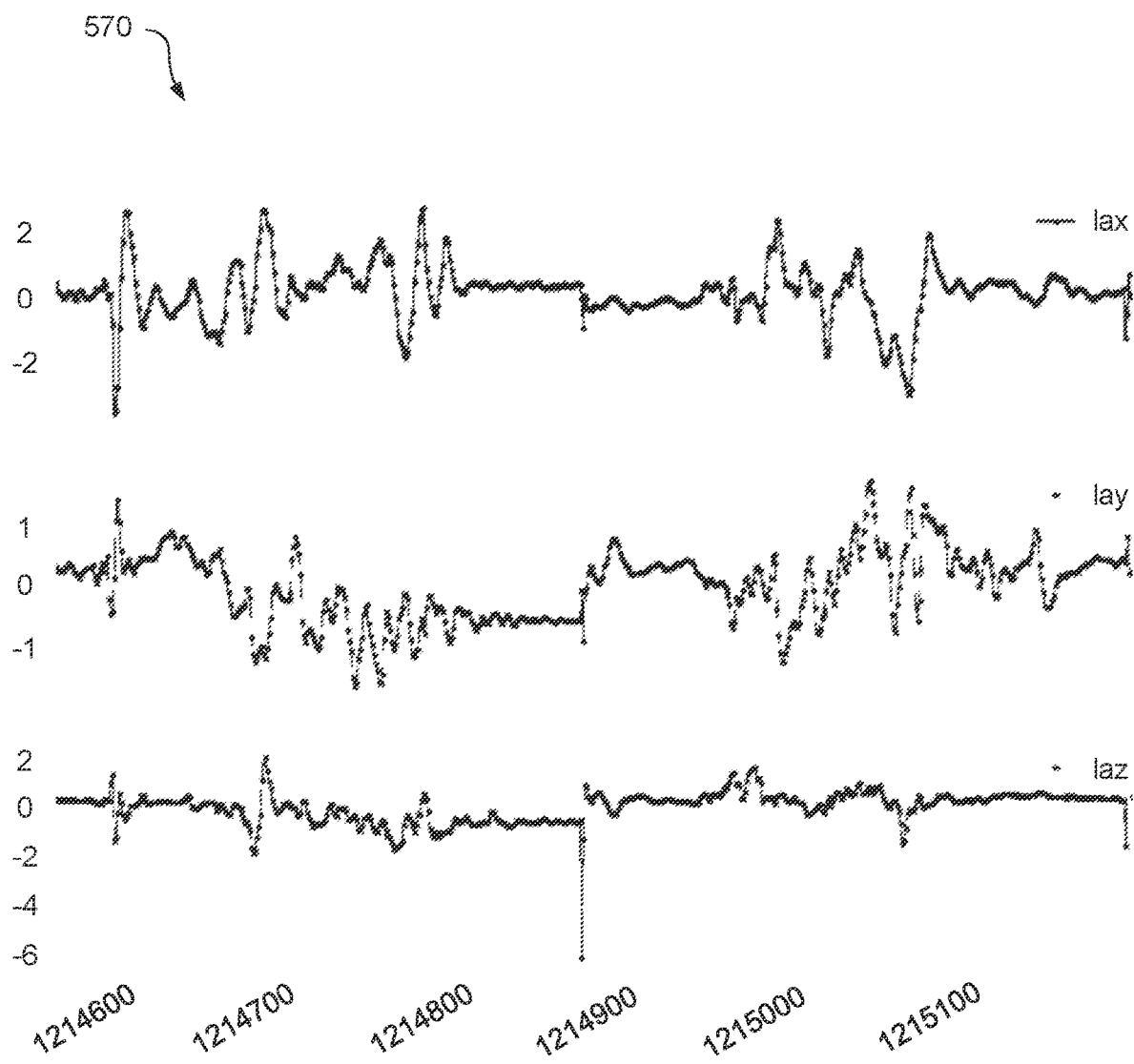
Figure 5H:
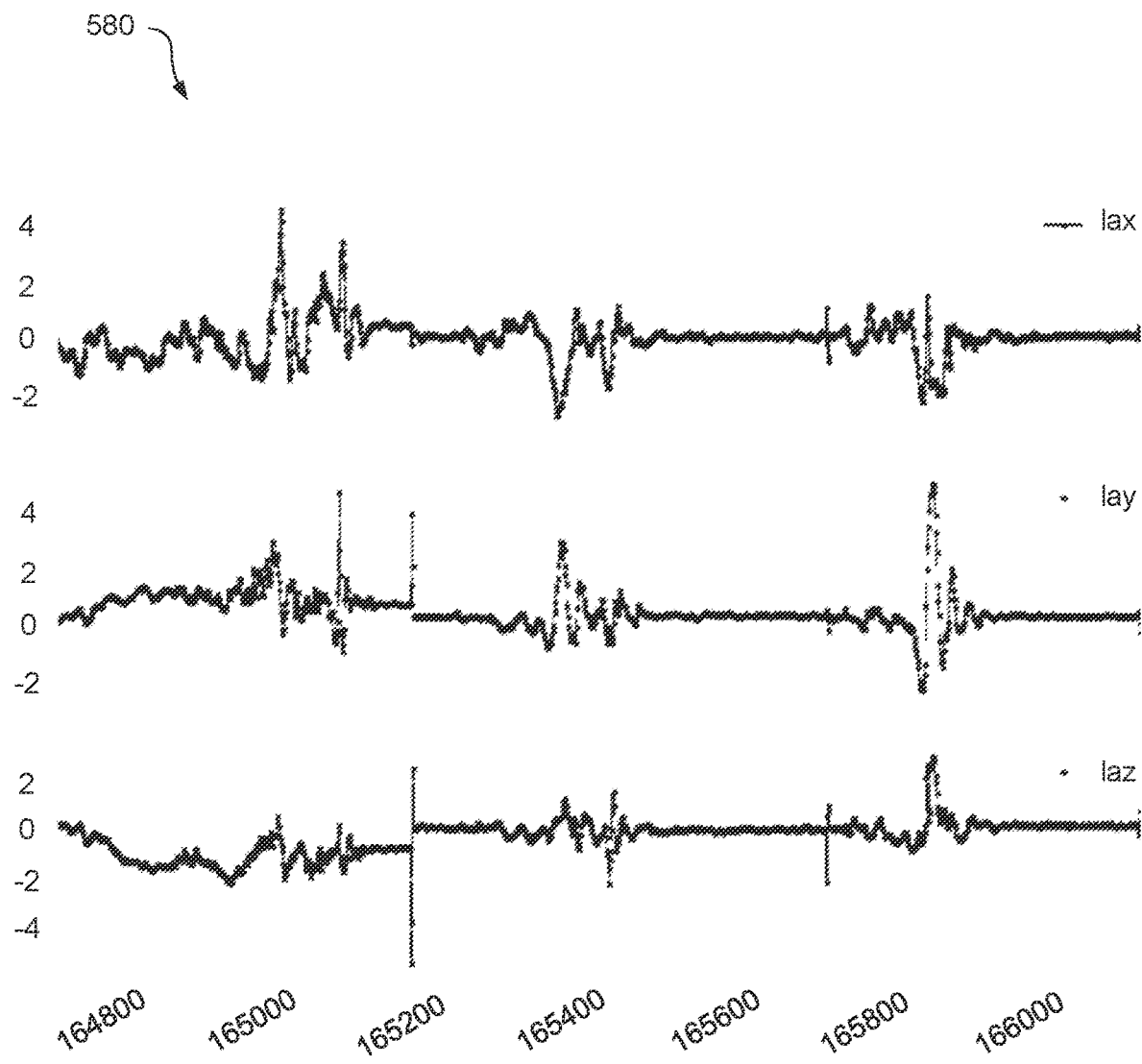

Referring to FIG. 5C, the graph 530 shows acceleration data in the x (top data), y (middle data), and z (bottom data) directions respectively, obtained from an accelerometer associated with a user that transitions from dangling to lying. Referring to FIG. 5D, the graph 540 shows acceleration data in the x (top data), y (middle data), and z (bottom data) directions respectively, obtained from an accelerometer associated with a user that transitions from sitting to laying. Referring to FIG. 5E, the graph 550 shows acceleration data in the x (top data), y (middle data), and z (bottom data) directions respectively, obtained from an accelerometer associated with a user that transitions from sitting to standing. Referring to FIG. 5F, the graph 560 shows acceleration data in the x (top data), y (middle data), and z (bottom data) directions respectively, obtained from an accelerometer associated with a user that transitions from laying to dangling. Referring to FIG. 5G, the graph 570 shows acceleration data in the x (top data), y (middle data), and z (bottom data) directions respectively, obtained from an accelerometer associated with a user that transitions from laying to sitting. Referring to FIG. 5H, the graph 580 shows acceleration data in the x (top data), y (middle data), and z (bottom data) directions respectively, obtained from an accelerometer associated with a user that transitions from standing to sitting.

Figure 6:
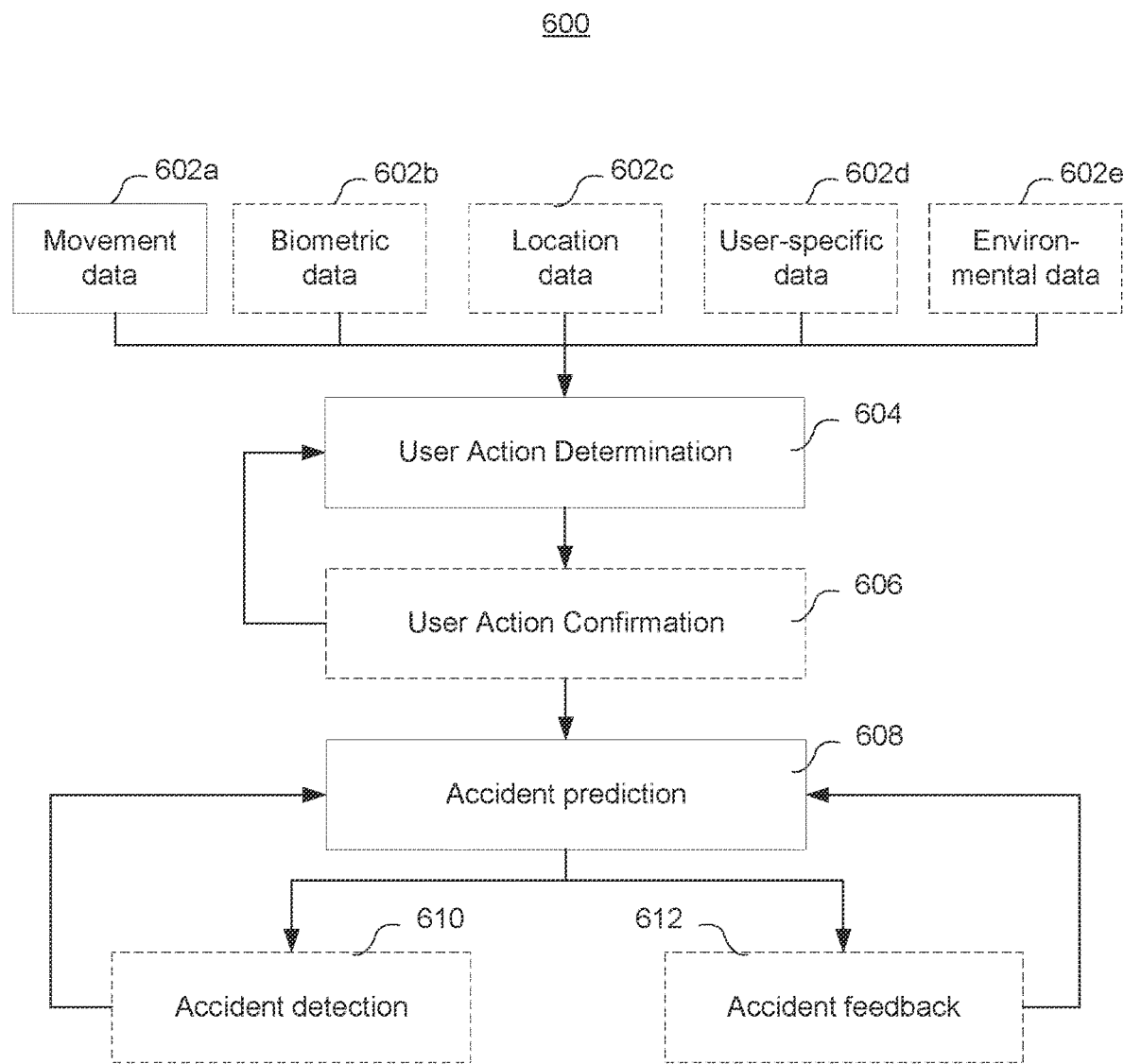
FIG. 6 shows a further flow diagram for accident prediction.

FIG. 6 shows a further flow diagram for accident prediction.

As described above, various types of information may be used as inputs for predicting the occurrence or one or more accidents. Monitoring data comprises at least movement data (602a), e.g. generated as acceleration data from an accelerometer in a user device, and may also comprise biometric data (602b) such as heart rate, blood pressure, etc., and may comprise location data (602c). User-specific data (602d) may also be obtained, which comprises static user data (e.g. user information) and historical user data (e.g. historical monitoring data, historical accidents, etc.). Environmental data (602e) may also be obtained, such as time of day, lighting conditions, etc. The input data may be preprocessed to filter out noise and to extract certain features therefrom.

A determination of a user action is made (604) using a first AI model as described above. In some embodiments, movement data may be captured from one or more additional devices (cameras, sensors, etc.) and used to confirm the user action and provide feedback to the first AI model (606).

A determination of a probability of one or more accidents occurring is determined (608) using a second AI model, which is based on the user action determined at 604, along with the monitoring data/user-specific data/environmental data.

Subsequent monitoring data may be provided to a third AI model to detect if an accident actually occurred (610). The detection of an accident occurrence may be fed back to the second AI model to inform the model whether the prediction was correct. Additionally or alternatively, accident feedback may be provided (612) by one or more staff and/or the user, for example in response to an alert notification, and fed back to the second AI model for training.

It would be appreciated by one of ordinary skill in the art that the system and components shown in the figures may include components not shown in the drawings. For simplicity and clarity of the illustration, elements in the figures are not necessarily to scale, are only schematic, and are non-limiting of the element structures. It will be apparent to persons skilled in the art that a number of variations and modifications can be made without departing from the scope of the invention as described herein.

It is contemplated that any part of any aspect or embodiment discussed in this specification can be implemented or combined with any part of any other aspect or embodiment discussed in this specification.

It should be recognized that features and aspects of the various examples provided above can be combined into further examples that also fall within the scope of the present disclosure.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

The invention claimed is:

1. A method for predicting an accident, comprising:
receiving monitoring data from a user device associated with a user, the monitoring data indicative of movement of the user;
determining a user action based on the monitoring data using a first artificial intelligence model; and
determining a probability of occurrence of one or more potential accidents based on the determined user action and the monitoring data using a second artificial intelligence model.

2. The method of claim 1, further comprising:
generating a notification for a potential accident having a probability of occurrence greater than a threshold probability.

3. The method of claim 2, wherein the notification comprises information including the potential accident and the probability of occurrence thereof.

4. The method of claim 2, further comprising determining a time before the potential accident is expected to occur, and including the time in the notification.

5. The method of claim 2, wherein the notification is sent to an alert device as one or more of: a graphical format, a text format, an audio format, and a vibration.

6. The method of claim 1, further comprising receiving an identifier of the user associated with the monitoring data, and using the identifier to access a database comprising user-specific data associated with the user, the user-specific data comprising one or more of: an age of the user, a gender of the user, a weight of the user, a height of the user, current health issues of the user; historical health issues of the user, historical accidents of the user, and an accident risk score for the user.

7. The method of claim 6, wherein determining the user action is further based on the user-specific data.

8. The method of claim 6, wherein determining the probability of occurrence of the one or more potential accidents is further based on the user-specific data.

9. The method of claim 1, further comprising determining if the user is stationary based on the user action, and when the user is stationary, determining a time that the user has been stationary, and wherein determining the probability of occurrence of the one or more potential accidents is further based on the time that the user has been stationary.

10. The method of claim 1, wherein the monitoring data further comprises location data of the user, and the method further comprises:
determining a location of the user,
wherein determining the probability of occurrence of the one or more potential accidents is further based on the determined location.

11. The method of claim 10, wherein the location of the user is outside of an authorized area, and the method further comprises generating a notification indicating that the user is outside of the authorized area.

12. The method of claim 1, wherein the monitoring data further comprises biometric data of the user, and wherein determining the probability of occurrence of the one or more potential accidents is further based on the biometric data.

13. The method of claim 1, further comprising receiving environmental data of a monitoring environment associated with the user, and wherein determining the probability of occurrence of the one or more potential accidents is further based on the environmental data.

14. The method of claim 1, further comprising, after determining the probability of occurrence of the one or more potential accidents, determining from subsequent monitoring data of the user whether an accident of the one or more potential accidents actually occurred using a third artificial intelligence model.

15. The method of claim 14, further comprising using an actual occurrence of the accident to further train the second artificial intelligence model.

16. The method of claim 1, further comprising:
   receiving feedback from a responsible agent as to whether an accident of the one or more potential accidents actually occurred; and
   using the feedback from the responsible agent to further train the second artificial intelligence model.

17. The method of claim 1, wherein the monitoring data indicative of movement comprises acceleration data in a plurality of directions.

18. An accident prediction system, comprising:
   a processor; and
   a non-transitory computer-readable medium comprising computer-executable instructions stored thereon, which when executed by the processor, configure the system to perform the following operations:
   receiving monitoring data from a user device associated with a user, the monitoring data indicative of movement of the user;
   determining a user action based on the monitoring data using a first artificial intelligence model; and
   determining a probability of occurrence of one or more potential accidents based on the determined user action and the monitoring data using a second artificial intelligence model.

19. The accident prediction system of claim 18, further comprising a communications hub, the communications hub located remotely from the processor and configured to sent send the monitoring data to the processor.

20. A non-transitory computer-readable medium comprising computer-executable instructions stored thereon, which when executed by a processor, configure the processor to perform the following operations:
   receiving monitoring data from a user device associated with a user, the monitoring data indicative of movement of the user;
   determining a user action based on the monitoring data using a first artificial intelligence model; and
   determining a probability of occurrence of one or more potential accidents based on the determined user action and the monitoring data using a second artificial intelligence model.

* * * * *